Patented Jan. 27, 1942

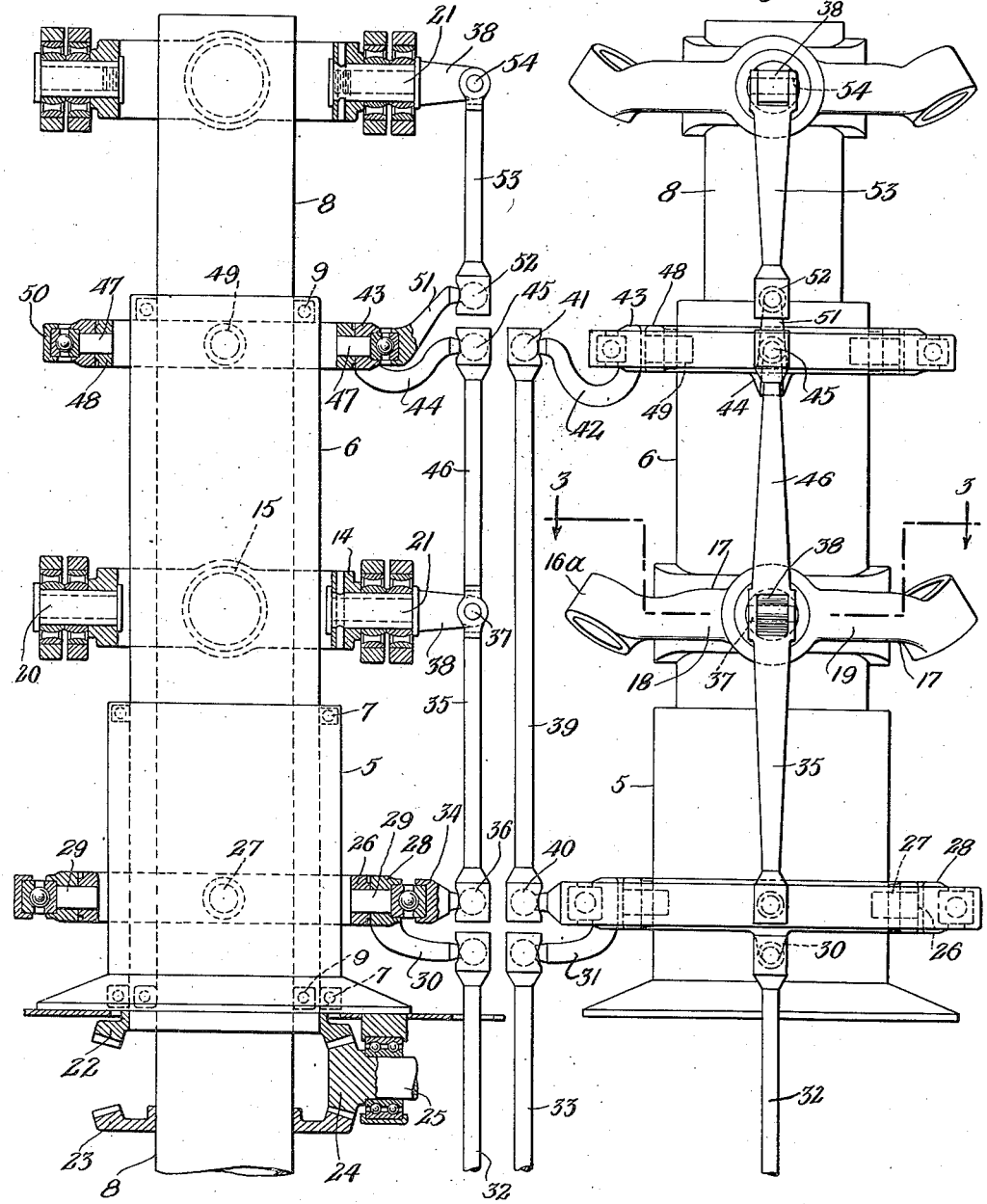

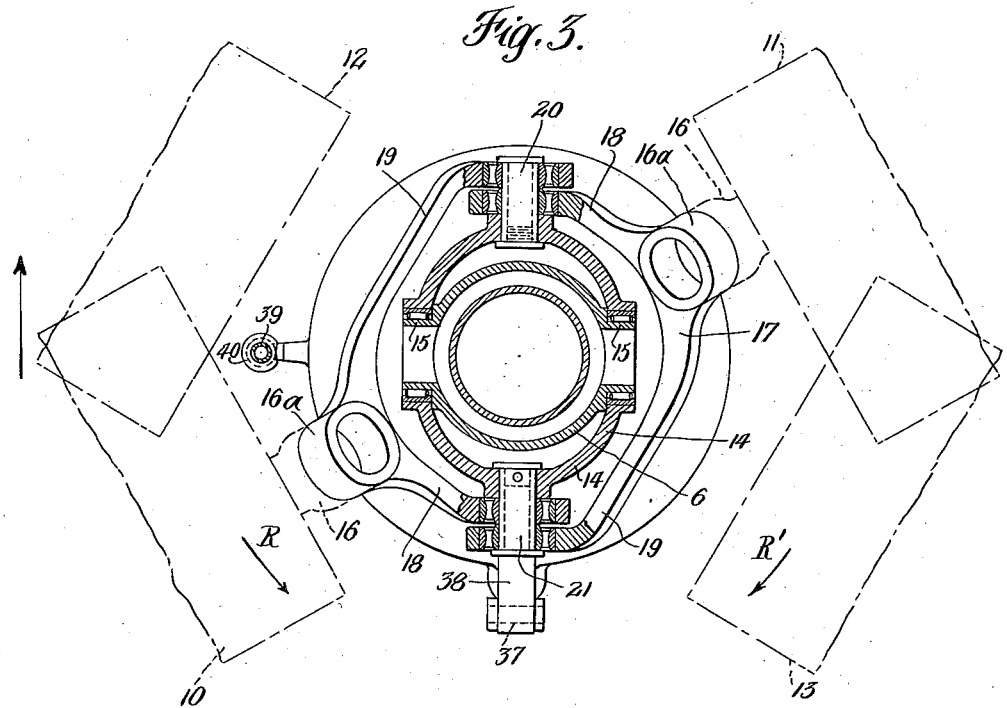
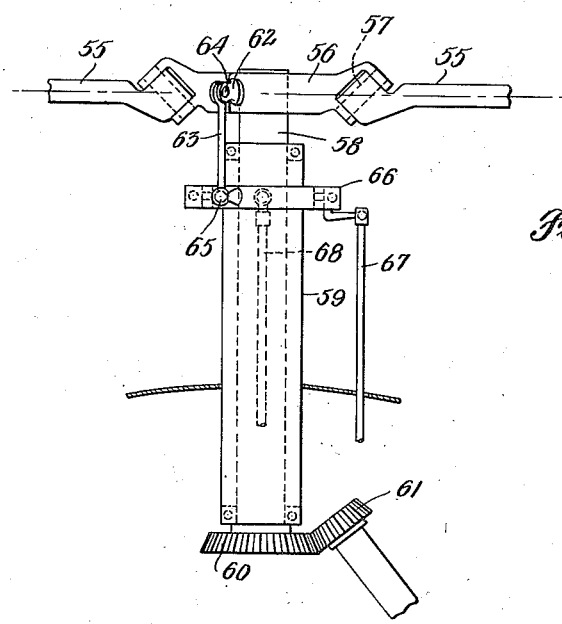

2,271,473

UNITED STATES PATENT OFFICE 2,271,473

ROTATIVE WINGED AIRCRAFT

James Allan Jamieson Bennett, Esher, England, assignor to Autogiro Company of America, Willow Grove, Pa., a corporation of Delaware Application July 6, 1939, Serial No. 282,959
In Great Britain January 1, 1938

6 Claims. (Cl. 244—17)

This invention relates to aircraft and more particularly to that type of craft provided with one or more sustaining rotors, such as gyroplanes, helicopters, or the like. The invention, moreover, is especially concerned with rotor control providing for maneuvering of the craft.

Still more particularly, the invention is concerned with "feathering" or "pitch" control, i. e., control by bringing about a shift in the lift line of the rotor or rotors by differentially and periodically varying the effective rotor blade incidence synchronously with rotation of the rotor.

One of the primary objects of the invention is the provision of a simple and effective pitch control mechanism, applicable either to single or multiple rotor aircraft, which pitch control mechanism utilizes certain pivotal mounting parts provided for the blades, i. e., operates through such mounting parts.

The invention, moreover, is especially adaptable to the type of rotor incorporating a pair of oppositely disposed blades, the arrangement of the structure being such that with this type of rotor, the blade mounting or mountings on which the blade is movable for pitch change does not carry the centrifugal load of the blades. Therefore, only relatively low friction need be overcome in controllably varying the blade pitch, the required control force being correspondingly small.

The manner in which the foregoing objects are achieved will be more apparent from a consideration of the following description, referring to the accompanying drawings, in which—

Figure 1 is a side view of a multiple rotor installation incorporating superimposed coaxial and oppositely rotating rotors, certain parts of the blade mounting members and control elements being shown in vertical section;

Figure 2 is a side elevational view of the mechanism shown in Figure 1;

Figure 3 is a horizontal sectional view through the rotor blade mounting for one of the rotors, taken as indicated by the section line 3—3 on Figure 2, and Figure 4 is a view of the control mechanism as applied to a single rotor installation.

Referring, first, to the form of Figures 1, 2 and 3, a fixed non-rotative hub support is shown at 5. The mast or rotative hub part 6 for the lower rotor is journaled as by bearings 7 in the non-rotative support 5. The mast or rotative hub 8 for the upper rotor is journaled by bearings 9 within the mast 6.

Since the blade and blade mounting arrangements for the two rotors are essentially the same, only one of them need be described in detail, and for this purpose reference is made to the lower rotor as shown in Figures 1, 2 and 3. As above indicated, in the preferred arrangement each rotor incorporates a pair of oppositely disposed blades 10 and 11, the inner end portions of which are shown in Figure 3, the direction of rotation of these blades being indicated by the arrow R. Figure 3 also indicates in phantom outline at 12 and 13 the inner ends of the pair of blades incorporated in the upper rotor, the direction of rotation of which is shown by the arrow R', opposite to the direction of rotation of the lower rotor.

The blades 10 and 11 are connected with the hub 6 through the intermediate or blade mounting member 14 formed as a ring surrounding the hub and pivoted thereto on trunnions 15—15, providing a pivot axis which is preferably disposed substantially in the plane of the blades but which, when viewed in plan, makes an acute angle with the longitudinal axes of the blades. The spar or root end fitting 16 of each blade is connected with a blade mounting fork 17, the prongs 18 and 19 of which are extended to embrace the blade mounting member 14. The connection of the blade to its mounting fork may desirably take the form of a "drag" pivot providing freedom for at least some lag and lead movement of the blades. While this pivot mechanism is not shown in detail herein, since it forms no part of the present invention per se, it may be noted that the pivot bearing housing 16a at the base end of each fork is so positioned as to provide a pivot axis inclined upwardly and inwardly with respect to the longitudinal axis of the blade, in view of which, lagging and leading displacements of the blade are also accompanied by a pitch change movement thereof, which may be employed for purposes such as those set out in copending application of Juan de la Cierva Serial No. 117,221, filed December 22, 1936, and issued October 1, 1940 as Patent No. 2,216,162.

The prongs 18 and 19 of the blade mounting fork are provided with apertured terminal portions cooperating with pivot pins 20 and 21, which pins are arranged in alignment along an axis intersecting the hub axis and preferably, though not necessarily, forming an oblique angle with respect to the longitudinal axes of the blades when viewed in plan. For most purposes, the pivot axis of pins 20—21 should be so angled with respect to the longitudinal blade axes as to include an acute angle at the leading side f each blade axis.

By virtue of this pivotal blade mounting, freedom for some flapping movement of the blades is provided, and when the flapping axis is oblique as illustrated, the blade flapping is accompanied by some pitch change movement. It may further be noted with regard to this blade mounting, wherein the blades are individually articulated to the intermediate or blade mounting member 14, that the mounting trunnions 15—15 for the member 14 are relieved of the centrifugal load of the blades during flight. Therefore, this blade mounting member may be tilted about the axis of trunnions 15—15 under the influence of only a relatively light control force.

The two rotors of the form of Figures 1 to 3 may be driven in opposite directions by gearing, including ring gears 22 and 23, the first of which is connected with the hub member 6 and the second with a downward extension of the hub member 8. Interposed between the two ring gears is a driving pinion 24 carried by a power shaft 25. This drive mechanism, at any convenient point may, if desired, incorporate either a manually operable or a free-wheeling clutch. The arrangement of Figures 1 to 3 is especially suitable for the helicopter type of machine in which the rotors are driven during flight, since the opposite rotation of the two rotors will eliminate torque in the body.

The control mechanism as applied to the form of Figures 1 to 3 includes a non-rotative gimbal ring assembly incorporating the ring 26 pivoted by trunnions 27 to the non-rotative hub support 5. The outer ring 28 of this assembly is pivoted on the inner ring by pivots 29—29, this outer ring being tiltable in all directions by means of the angularly offset arms 30 and 31 to which the push pull connections 32 and 33 are universally coupled. This non-rotative gimbal ring assembly has journal thereon a rotative ring 34 which is coupled with the blade mounting member of the lower rotor by means of connection 35. The lower end of this member 35 has a universal connection 36 with the ring 34 and a single pivot connection 37 with the radial extension 38 of the flapping pivot pin 21.

The connection 35 causes the rotative ring 34 to rotate with the lower rotor and, therefore, upon tilting of the lower gimbal ring assembly in any direction, the blade mounting member 14 for the lower rotor is caused to periodically vary its inclination synchronously with rotation of the rotor.

The control connections for the upper rotor include a link 39 universally coupled as at 40 with the rotative ring 34 and also universally coupled as at 41 with an arm 42 projecting from the outer ring 43 of a second gimbal ring assembly, this outer ring also being provided with an arm 44 having universal coupling 45 with the upper end of the connection 46 which extends outwardly to the radial projection 38 of the pivot 21 of the lower rotor. Conveniently the links 35 and 46 may be made as one rigid part, as clearly shown in Figure 2, which is pivoted as at 37 to the extension 38 of pin 21.

The outer ring 43 of the upper ring assembly is pivoted by pins 47—47 to an inner ring 48 which, in turn, is pivoted at 49 to the mast or hub 6 for the lower rotor. Thus the upper gimbal ring is rotatable with the lower rotor. A rotative ring 50 is mounted on ring 43 and provided with an arm 51 universally coupled at 52 with a link 53 which extends upwardly for pivotal connection 54 with extension 38 of pivot pin 21 of the upper rotor blade mounting. The rotative ring 50 is caused to rotate with the upper rotor by virtue of the single pivot connection 54.

The control system above described provides for tilting of the two gimbal ring assemblies in the same direction and this, in turn, (through links 35 and 53) causes the blade mounting members 14 for the two rotors to oscillate synchronously with rotation of the respective rotors. Tilting of the blade mounting members 14 differentially varies the incidence of the opposed blades of each rotor because of the obliquity of the axis of the tilting trunnions 15—15 with respect to the longitudinal axes of the blades, when viewed in plan.

The manual control organ or organs employed for maneuvering the craft in roll and pitch are connected with the push-pull members 32 and 33, the orientation of the control connections preferably being such as to provide instinctive control. For example, a nose-down controlling movement by forward displacement of the usual type of control stick and a left banking moment under the influence of a tilting of the control stick to the left. For further information with respect to the orientation of the control hook-up, reference may be had to copending application of Juan de la Cierva, Serial No. 698,372, filed November 16, 1933.

In the modified arrangement illustrated in Figure 4, the control system in accordance with this invention is shown as applied to a single rotor installation incorporating a pair of oppositely disposed blades, the inner end of a spar mounting for each being shown at 55. As before, each blade is connected with a blade mounting fork 56 by means of a drag pivot 57, although, in this instance, the drag pivot has been oppositely inclined with respect to the longitudinal blade axis, i. e., upwardly and outwardly, in order to provide for the jump or "direct" take-off as disclosed, for example, in the copending application of Juan de la Cierva, Serial No. 738,349, filed August 3, 1934. The two blade mounting forks are pivoted on an intermediate or blade mounting member not shown in Figure 4, but of the same arrangement as the member 14 hereinbefore referred to. The blade mounting member is also pivotally connected with the rotative hub shaft 58 which is journaled in a fixed support 59.

At its lower end the hub shaft 58 carries a gear 60 adapted to be driven by a pinion 61 for starting purposes. As in the first form, an overrunning clutch is desirably incorporated in the drive and, as more fully disclosed in the copending application of Juan de la Cierva, Serial No. 738,349, the drive is preferably disconnected prior to take-off, after having accelerated the rotor to a speed substantially greater than that of normal flight. By virtue of the inclination of the drag pivots 57, application of the driving torque causes the blades to lag and reduce their pitch, and cessation of the driving torque at the moment of take-off causes the blades to lead and increase their pitch, whereby to utilize kinetic energy and effect substantially direct take-off.

The control system as applied to the arrangement of Figure 4, again makes use of a flapping pivot part 62 which is coupled to link 63 by means of a pivot 64. The lower end of link 63 is universally connected as at 65 with the rotative ring 66 mounted on a non-rotative gimbal ring assembly arranged for universal tilting under the influence of the push-pull members 67 and 68.

The single rotor installation of Figure 4 also affords a number of advantages hereinbefore referred to in connection with the first form described, including the fact that the pitch pivot on which the blades are movable for control purposes is not subject to the load of centrifugal force during the rotation of the rotor.

I claim:

1. In an aircraft, a sustaining and controlling rotor incorporating a hub and at least one blade, a blade mounting member pivoted to the hub on an axis providing for pitch change movement of the blade, means for pivotally connecting the blade to said member with freedom for flapping movement, and control mechanism for periodically tilting the blade mounting member synchronously with rotation of the rotor, said mechanism including a non-rotative ring universally tiltable about a point spaced axially of the hub from the axis of pivoting of the blade mounting member thereon, and a connection between the blade mounting member and said ring, said connection being rotative with the rotor and constraining the blade mounting member to oscillate about the axis of its mounting periodically with rotation of the rotor when said non-rotative ring is tilted.

2. In an aircraft, a sustaining and controlling rotor incorporating a hub and at least one blade, a blade mounting member pivoted to the hub on an axis providing for pitch change movement of the blade, means for pivotally connecting the blade to said member with freedom for flapping movement, and control mechanism for periodically tilting the blade mounting member synchronously with rotation of the rotor, said mechanism including a non-rotative ring universally tiltable about a point offset from the plane of connection of the blade with the hub, a rotative ring mounted on the first ring and tiltable therewith, and a connection between the blade mounting member and said rotatable ring constraining the blade mounting member to oscillate periodically with rotation of the rotor when said non-rotative ring is tilted.

3. In an aircraft, a sustaining and controlling rotor incorporating a hub and at least one blade, a blade mounting member pivoted to the hub on an axis providing for pitch change movement of the blade, means for pivotally connecting the blade to said member with freedom for flapping movement, and control mechanism for periodically tilting the blade mounting member synchronously with rotation of the rotor, said mechanism including a non-rotative ring universally tiltable about a point offset from the plane of connection of the blade with the hub, a rotative ring mounted on the first ring and tiltable therewith, and a connection between the blade mounting member and said rotatable ring constraining the blade mounting member to oscillate periodically with rotation of the rotor when said non-rotative ring is tilted, said connection being coupled with a pivot part incorporated in the pivotal mounting of the blade on the blade mounting member.

4. In an aircraft, a pair of superposed oppositely rotating rotors, each incorporating a rotative hub and a pair of oppositely disposed sustaining blades, for each rotor a blade mounting member pivotally mounted on the rotative hub therefor on an axis providing for pitch change movement of the blades, the blades of each rotor being pivotally connected with the blade mounting member therefor with freedom for movement in the flapping sense, and pitch control mechanism for the rotors including a controllably tiltable non-rotative ring, a ring rotatively mounted on the first ring and tiltable therewith, a third tiltable ring rotative with one of said rotors, a fourth ring rotatively mounted on the third ring and tiltable therewith, and control connections between the first rotative ring and the blade mounting member for said one rotor, between the first rotative ring and the third ring, and between the fourth ring and the blade mounting member for said second rotor.

5. In an aircraft, a pair of superposed oppositely rotating rotors, each incorporating a rotative hub and a pair of oppositely disposed sustaining blades, for each rotor a blade mounting member pivotally mounted on the rotative hub therefor on an axis providing for pitch change movement of the blades, the blades of each rotor being pivotally connected with the blade mounting member therefor with freedom for movement in the flapping sense, and pitch control mechanism for the rotors including a pair of tiltable gimbal ring assemblies, each incorporating one ring which is rotatively mounted on another, and control connections between the blade mounting member for one rotor and one of said rotative rings and between the blade mounting for the other rotor and the other of said rotative rings, and controllable means for tilting the gimbal ring assemblies in the same sense.

6. An aircraft sustaining rotor including a hub and at least one blade, a blade mounting member pivotally connected with the hub on an axis providing for pitch change movement of the blade, a blade mounting fork embracing said member, pivot means for connecting the blade fork with the blade mounting member including a pivot pin, the axis of which provides freedom for blade movement in the flapping sense and which pin projects radially outwardly from the adjacent prong of of the blade mounting fork, and controllable means for constraining the blade mounting member to tilt periodically in synchronism with rotation of the rotor including a control connection rotative with the rotor and coupled with said extension of the flapping pivot pin.

JAMES ALLAN JAMIESON BENNETT.

CERTIFICATE OF CORRECTION.

Patent No. 2,271,473.　　　　　　　　　　　　　January 27, 1942.

JAMES ALLAN JAMIESON BENNETT.

It is hereby certified that error appears in the printed specification of the above numbered patent requiring correction as follows: Page 2, first column, line 1, for "f" read --of--; line 42, for the word "journal" read --journaled--; page 3, first column, line 27, after "its" insert --pivotal--; and that the said Letters Patent should be read with this correction therein that the same may conform to the record of the case in the Patent Office.

Signed and sealed this 24th day of March, A. D. 1942.

(Seal)　　　　　　　　　　　　　　　　　　　　Henry Van Arsdale,
　　　　　　　　　　　　　　　　　　　　Acting Commissioner of Patents.